United States Patent
Padmanabhan et al.

(10) Patent No.: US 6,904,477 B2
(45) Date of Patent: Jun. 7, 2005

(54) VIRTUAL HOST CONTROLLER INTERFACE WITH MULTIPATH INPUT/OUTPUT

(75) Inventors: Seetharaman Padmanabhan, Milpitas, CA (US); Chitrank Seshadri, San Jose, CA (US); John H. Danielson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/473,286
(22) PCT Filed: Apr. 12, 2002
(86) PCT No.: PCT/US02/11843
§ 371 (c)(1),
(2), (4) Date: Sep. 26, 2003
(87) PCT Pub. No.: WO02/084471
PCT Pub. Date: Oct. 24, 2002

(65) Prior Publication Data
US 2004/0107300 A1 Jun. 3, 2004

Related U.S. Application Data
(60) Provisional application No. 60/283,659, filed on Apr. 13, 2001.

(51) Int. Cl.[7] ............................................. G06F 13/12
(52) U.S. Cl. ......................... 710/74; 719/321; 711/114
(58) Field of Search .......................... 719/321; 710/74; 709/1; 711/6, 100, 114; 714/5, 8, 100

(56) References Cited

U.S. PATENT DOCUMENTS

| | | | |
|---|---|---|---|
| 5,170,470 A | 12/1992 | Pindar et al. | 710/8 |
| 5,832,492 A | 11/1998 | Wooten | 707/101 |
| 6,003,088 A | 12/1999 | Houston et al. | 709/230 |
| 6,092,116 A | 7/2000 | Earnest et al. | 709/230 |
| 6,321,350 B1 | 11/2001 | Baskey et al. | 714/704 |
| 6,675,258 B1 * | 1/2004 | Bramhall et al. | 711/114 |
| 2003/0172331 A1 * | 9/2003 | Cherian et al. | 714/712 |
| 2004/0172636 A1 * | 9/2004 | Do et al. | 719/321 |

OTHER PUBLICATIONS

International Application No. PCT/US02/11843, PCT Written Opinion, dated of mailing Jan. 23, 2003.
International Application No. PCT/US02/11843, PCT International Preliminary Examination Report, date of mailing May 29, 2003.
International Application No. PCT/US02/11843, International Search Report, date of mailing Sep. 16, 2002.

* cited by examiner

*Primary Examiner*—Kim Huynh
*Assistant Examiner*—Harold Kim
(74) *Attorney, Agent, or Firm*—Finnegan, Henderson, Farabow, Garrett & Dunner, L.L.P.

(57) ABSTRACT

A processor-based system (200) with a multipath I/O architecture, including a virtual host controller interface (vHCI) layer (280) between a common architecture layer (270) and a physical host controller interface layer (290), which may include convential host bus adapters (HBAs) coupled to target decives such as storage devices (240, 250) in a storage area network (SAN). Target drivers send I/O requests to a common architecture layer, which forwards them to the vHCI layer (280), which then sends them to HBAs for sending to the target devices (240, 250). A multipathing driver interface (MPXIO) layer (310) resides beneath the vHCI layer (280), and determines target device path information for the vHCI layer (280). Positioning the MPXIO layer (310) beneath the vHCI layer avoids the need for multipathing target drivers (360) above the common architecture layer. A failover operations module may be provided for each type of target device to provide the vHCI layer (280) with failover protocol information in the event of a failed path.

29 Claims, 4 Drawing Sheets

VIRTUAL HOST CONTROLLER INTERFACE WITH MULTIPATH INPUT/OUTPUT

This application claims the benefit of U.S. Provisional Application No. 60/283,659, of Osher et al., filed Apr. 13, 2001, entitled "Geometrically Accurate Compression and Decompression".

BACKGROUND OF THE INVENTION

Attached as Appendix A to provisional application '659 is a document entitled "Multiplexed I/O (MPXIO)", which gives implementation details for an embodiment of the invention. Also attached to provisional application '659, as Appendices B and C, are manual pages (man pages) that would be suitable for a UNIX (or other OS) implementation of the new MPXIO architecture. The U.S. Provisional Application No. 60/257,210, with its Appendices, is incorporated herein by reference.

This invention relates to a new system architecture providing multiple input/output (I/O) paths to client devices, such as storage devices, in a processor-based system or network.

As more systems use storage area networks (SANs), environments are created wherein multiple hosts are communicating with a given storage device. In both uniprocessor and multiprocessor settings, multiple paths are formed to the same storage device. These multiple paths can provide greater bandwidth, load balancing, and high availability (HA).

In I/O architectures currently in use, such multiple paths to storage devices may be provided as illustrated in the storage area network of FIG. 1. In this figure, a host system 10 is of conventional design, using a processor 20, memory 30, and other standard components of a computer system (such as display, user input devices, and so on). The system 10 also typically includes one or several host bus adapters (HBAs) such as HBAs 40 and 50, which communicate via switches 60 and 70 with storage devices 80 and 90, respectively. Alternatively, the storage devices may be multiported, in which case the switches may not be used.

Software layers 100 are used by the host 10, and as shown in FIG. 3, in systems currently in use a common architecture layer 110 may be provided above the HBA layer, such as applicant Sun Microsystems, Inc.'s "SCSA" (Sun Common SCSI Architecture). Above this layer are device drivers (such as applicant's "SSDs", i.e. Sun Microsystems, Inc.'s SCSI disk drivers) 120 and 130. More specifically, these drivers 120 and 130 are in this example different instances of the same device driver.

Above the device driver layer is a metadriver (MD) 140. When the host 10 sends an I/O request to, e.g., storage device 80 (storage 90 being omitted from FIG. 3 for simplicity), the request is sent through the metadriver 140 to the drivers 120 and 130. If one of the paths to a storage device fails (e.g. path 82 or 84 to storage 80, or path 92 or 94 to storage 90), then it will be necessary to execute the I/O request via a path that has not failed.

In the case of symmetric storage devices, the paths may easily be load balanced, and failover for an I/O request is accomplished simply by using the non-failing path. For asymmetric devices, the system must be informed that the first path has failed. For instance, in FIG. 2 if a write command is sent via the metadriver 140 through driver 120 and SCSA layer 110 to HBA 40, and it turns out that path 82 to storage 80 fails, then this is communicated back up to the driver 120, which will typically execute additional tries. Each try may be very time-consuming, taking up to several minutes to execute. If path 82 has failed, this is wasted time; eventually, the driver 120 stops retrying, and the metadriver 140 will try the other path. Assuming path 84 is operational, the I/O attempt via driver 130 and HBA 50 will succeed.

In such a system, there are a number of inefficiencies, primarily including the time wasted retrying the I/O request along a failed path. A system is needed that eliminates such inefficiencies, and in particular that allows retrying of I/O requests more quickly along a working path.

Issues with Using Multiple Driver Instances

An issue that arises in connection with multipath devices is the structure of the Solaris (or other OS) device tree and the device autoconfiguration process. The OS device tree enumerates physical connections to devices; that is, a device instance is identified by its connection to its physical parent. This is in part due to the bottom-up device autoconfiguration process as well as the lack of self-enumeration support in the I/O controllers available at the time this framework was initially designed.

The presence of multiple device instances for a single device can lead to various issues. One of these is wastefulness of system resources, due to the consumption of system namespace and resources as each path to a device is assigned a unique device instance and name. Thus, as the number of HCIs to common pools of devices increases, the numbers of devices that can be hosted decreases. The minor number space available today for "sd" (SCSI disk) and "ssd" (which refers, e.g., to fibre channel SCSI disk device drivers) devices limits the Solaris OS to 32K single-pathed drives. Each additional path to a pool of devices decreases this by a factor of 2.

Each duplicate instance wastes kernel memory in the form of multiple data structures and driver soft states. Inodes in the root file system are also wasted on the duplicated /devices and /dev entries.

Another issue that arises is that system administrators, as well as applications, are faced with a challenges when attempting to understand and manage multipath configurations in the OS. Such challenges include:

1. prtconf(1m): Since prtconf displays the structure of the OS device tree, it lists each instance of a multipath device. There is no way currently for a system administrator to quickly determine which devices in the output are in fact the same device. Another piece of information that is lacking is the identity of the layered driver that is "covering" this device and providing failover and/or load balancing services.

2. Lack of integration with DR (dynamic reconfiguration): DR has no way of knowing if a device is attached to multiple parent devices; it is left up to the system administrator to identify and offline all paths to a given device. Some of the layered products (e.g., DMP products—dynamic multipathing products) actually prevent DR from occurring as it holds the underlying devices open and does not participate in the DR and RCM (reconfiguration coordination manager) framework.

3. Multiple names and namespaces in /dev: Each instance of a multipath disk device appears in /dev with a distinct logical controller name; the system administrator needs to be aware that a given device has multiple names, which can lead to errors during configuration or diagnosis. In addition, layered products define additional product-specific namespaces under /dev to represent their particular multipath device, e.g. /dev/ap/{r}dsk/*, /dev/dmp/{r}dsk/*, /dev/osa/{r}dsk/*, etc.

Both administrators and applications need to be aware of these additional namespaces, as well as knowing that the multi-instance names in /dev may be under the control of a layered driver.

Another issue that arises due to the use of layered drivers has to do with their statefulness. The layered driver approach becomes significantly more difficult to implement once stateful drivers such as tape drivers are deployed in multi-path configurations. Driver state (such as tape position) needs to be shared between the multiple instances via some protocol with the upper layered driver. This exposes an additional deficiency with using layered driver for multipath solutions: a separate layered driver is needed for each class of driver or device that needs to be supported in these configurations.

Issues with Failover Operations

Yet another issue is that of failover/error management. Layered drivers communicate with the underlying drivers via the buf(9s) structure. The format of this structure limits the amount of error status information that can be returned by the underlying driver and thus limits the information available to the layered driver to make proper failover decisions.

In addition, the handling of failover operations by a system such as that shown in FIG. 1 can present other challenges. Switches 60 and 90 are multiport switches, providing redundant paths to storage 80 (paths 82 and 84) and storage 90 (paths 92 and 94). If path 86 to switch 60 fails, the system needs to activate path 96, which will be a different operation for storage device 80 than for storage device 90, which in general will be different types of storage devices.

An efficient way of activating paths common to different storage devices, such as when a failover operation is executed, is thus needed.

SUMMARY OF THE INVENTION

A processor-based architecture according to an embodiment of the present invention includes a virtual host controller interface (vHCI) layer which handles I/O requests to target devices. This layer is preferably beneath a common architecture layer, which is beneath the target drivers, and above the HBA or physical host controller interface (pHCI) layer. A multiplex I/O module discovers available paths to the target devices, and communicates these to the vHCI layer, which then uses the path information to transmit the I/O requests to the target devices. In the case of a failed path, the vHCI can immediately send an I/O request by an alternate path, without the need to retry or to bounce the failed I/O request back up to the driver layer. Use of the MPXIO module allows the multipathing protocol to be provided at a low level, thus avoiding the need for a multipathing target driver for each type of target used. The vHCI layer may also communicate with failover operations modules, which provide target device-specific information for each type of target, and which may be compiled separately from the vHCI to allow addition of the modules to the system without having to reboot.

Other embodiments and features are discussed below.

DESCRIPTION OF THE PREFERRED EMBODIMENTS

Figure 1:
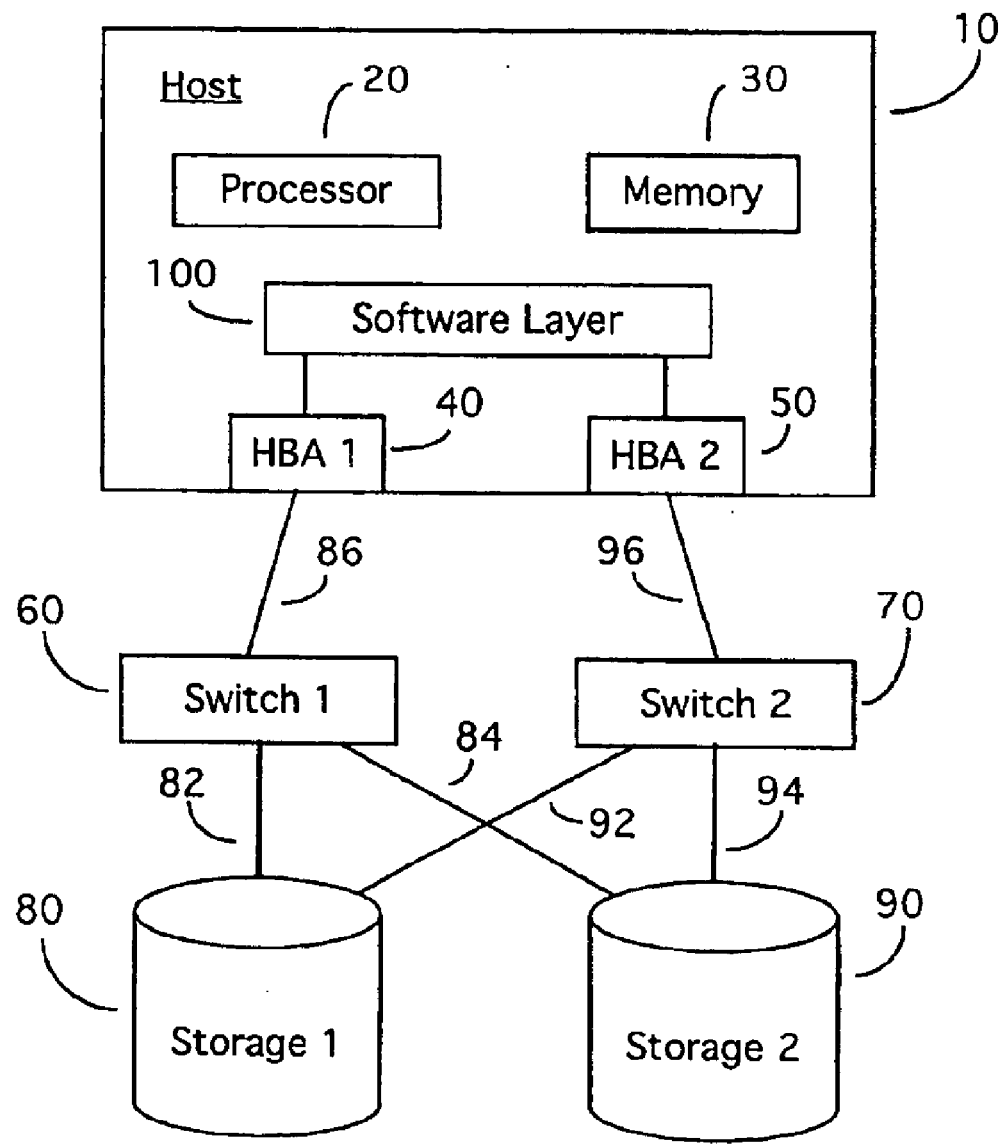
FIG. 1 is a block diagram of a conventional storage area network (SAN).

The system of the invention provides a new architecture for representing and managing devices that are accessible through multiple host controller interfaces (HCIs) from a given instance of the operating system (OS). This type of device configuration, referred to herein as "multipath", is capable of supporting failover semantics in the event of interconnect and controller failures, as well as balancing the I/O workload across the set of available controllers. This application describes the new multiplexed I/O (MPXIO) architecture, along with a set of changes to the core of the OS which support this architecture.

A suitable OS for an embodiment of the invention is applicant's UNIX operating system, the Solaris OS. Hereinafter, reference will be made to the "Solaris OS" or just to the OS, and it should be understood that this refers to the Solaris OS or any other suitable operating system for the invention (e.g. other UNIX operating systems such as Linux, or non-UNIX operating systems).

Modern high-performance I/O bus architectures are migrating from a host-centric model, where storage is private to a single host, towards the SAN (Storage Area Network) model, where storage is treated in a peer-to-host-computers manner and is managed as a pool of resources to be shared among multiple heterogeneous hosts via a shared I/O interconnect. Combined with this is an increase in pressure by RAS (reliability-availability-serviceability) requirements and performance metrics, as the OS pushes deeper into enterprise and HA (high availability) environments. This requires increasing degrees of availability, scalability, performance, and manageability.

Certain platforms, such as those of the Solaris OS, will attach to these SANs using multiple host controller interfaces and I/O interconnects controller interfaces (either of which types of interfaces may referred to as HCIs), to increase both availability and I/O bandwidth to the storage pools. Some operating systems may not be optimally designed for supporting the multipath device configurations presented by these new SAN architectures. This stems from the fact that a given device that is visible through multiple host controllers is identified as separate and independent device instances by such operating systems, e.g. the Solaris OS, and its suite of management applications.

The invention thus relates to a new software architecture for managing multiported storage devices for processor-based systems. Background technology relating to this invention is described in the book Writing Device Drivers (August 1997), a publication of SunSoft, Inc., which is a subsidiary of applicant Sun Microsystems, Inc. That book is incorporated herein by reference.

The following example, taken from a system with a dual-pathed Fibre Channel A5000 storage array of applicant Sun Microsystems, Inc., illustrates this fact. Note the matching WWN (worldwide name) in the unit-address of the two ssd target devices:

/dev/dsk/c2t67d0s0->
. ./. ./devices/pci@6,4000/SUNW,ifp@2/ssd@w220000203709c3f5,0:a
/dev/dsk/c3t67d0s0->
. ./. ./devices/pci@6,4000/SUNW,ifp@3/ssd@w220000203709c3f5,0:a In a current version of the Solaris OS, the operating system would not manage these multiple instances as a single device, but would leave it up to other products to do so, such products being implemented using vendor-specific layered device drivers to provide failover and load balancing support. Such products include Alternate Pathing (AP—Sun Microsystems, Inc.), RDAC (Symbios/LSI), DMP (Veritas), and EMC PowerPath. However, each of these products suffers from a number of limitations (including bugs), which can result from poor integration with the Solaris OS and their inability to interact seamlessly with one another.

Competing OS vendors such as SCO UnixWare, Data General, and EBM's Sequent all support multipath I/O as part of their enterprise high availability storage solution. In addition, IBM's mainframe I/O architecture supports multichannel device access.

General Design Features of the New Architecture

This invention involves a new architecture for naming and managing multipath devices in the OS. This architecture eliminates the need for the multiple layered implementations available as unbundled or third party products that currently support device multipathing.

A feature of one embodiment of the new architecture is that the device tree is restructured to permit a multipath device to be represented as a single device instance in the OS, rather than having one instance per physical path, as is the case in systems presently in use. Multipath devices are attached below command-set specific pseudobus nexus drivers, otherwise called a virtual Host Controller Interface (vHCI) driver. Here, "virtual" refers to a reconfigurable or reprogrammable structure (which may include software or firmware, but may also include hardware elements), in contrast to a conventional HBA or physical host controller interface.

vHCI drivers are provided with naming and transport services by one or more physical Host Controller Interface (pHCI) devices, which share the common command set or bus architecture such as SCSI-3.

The architecture also specifies a set of core services for path management support to be exported by vHCI drivers. vHCI drivers will also implement a subset of the DR interfaces currently defined for bus nexus drivers.

In addition, the architecture specifies a set of recommended practices for the command set-specific implementations to consider where applicable.

Specific Embodiments of the New Architecture

Figure 3:
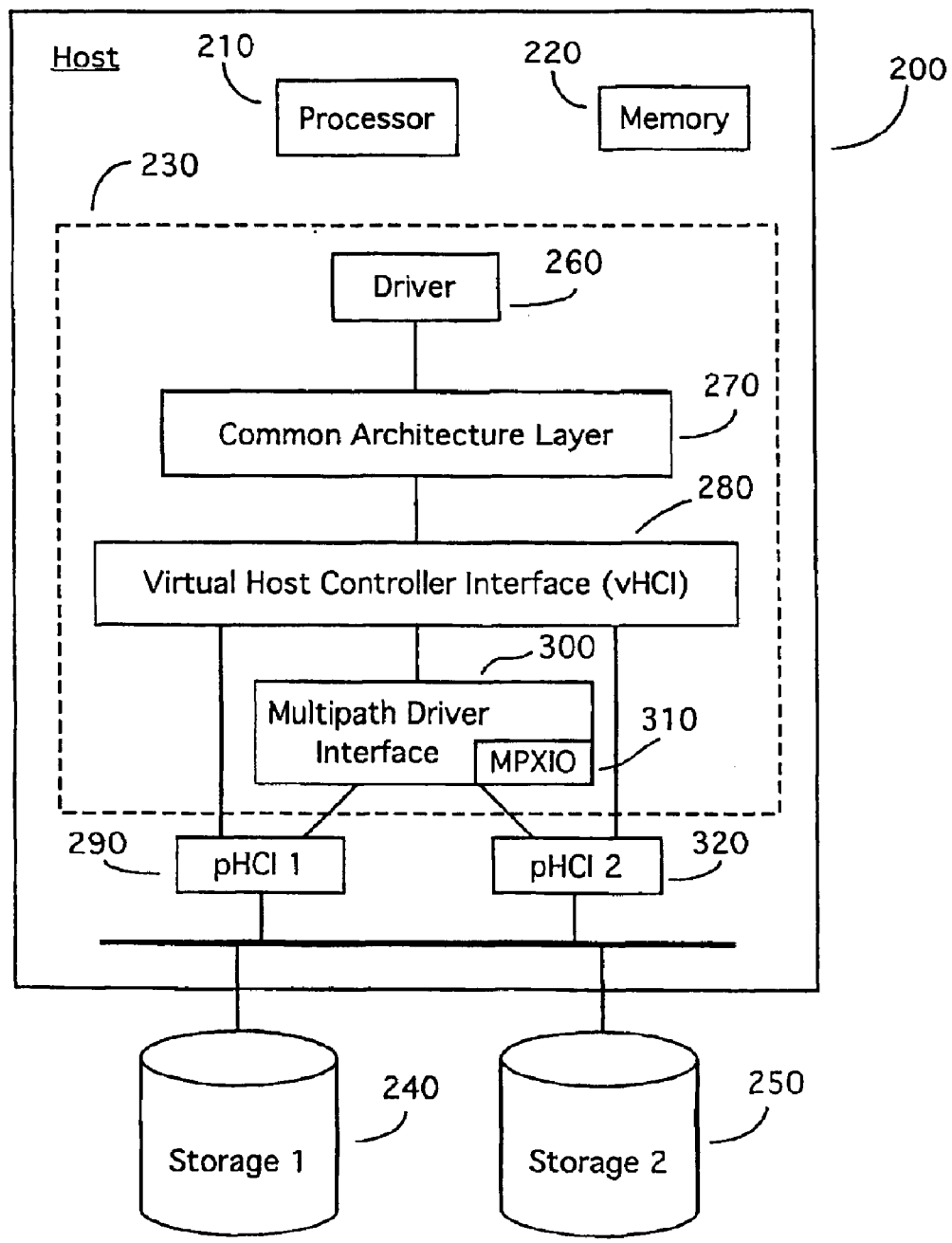
FIG. 3 is a block diagram of a new multipathing architecture according to the invention.

FIG. 3 is a block diagram showing a new architecture according to one embodiment of the invention. A host system 200, which may be a workstation, personal computer, server, or the like, includes at least one processor (though it may be a multiprocessor system) 210, memory 220, and other conventional processor system features not separately shown, including user interface and input hardware and software (keyboard, mouse, etc.), a display, and any other components useful to input or output of information and interaction with a user.

Software layers 230 reside on the system 200 and are executed by the processor 210 and by appropriate dedicated hardware. The system 200 communicates with storage devices 240 and 250. Although two storage devices are shown for this embodiment, one storage device or more than two may be used. The storage devices may be any combination of tape storage, disks, and other conventional storage hardware, using the appropriate drivers. For the description of FIG. 3, by way of example the storage devices 240 and 250 will be assumed to be the same type of device, such as two disk drives, though any combination of devices is possible.

A conventional driver 260 is used, which issues command packets for both storage devices 240 and 250. These are sent down to a common architecture layer 270, which in the case of applicant's systems maybe the SCSA (Sun Common SCSI Architecture) layer, but in other systems will be an equivalent software layer.

For the purposes of the invention, the terms "packet", "request" and "command", and other references to I/O communications, may be taken as referring to any I/O information or the like that may be communicated along a path from a processor, a user application, or other hardware or software. It will be understood to those skilled in the art that such packets, etc. may be modified or adapted along the path to a target device, and thus the forwarding, resending, etc. of a packet, command, or the like does not mean that the forwarded item is unaltered.

A system according to the present invention includes a virtual host controller interface (vHCI) layer 280, which sends and receives I/O packets or commands between the common architecture layer 270 and a multipath driver interface (MDI) layer 310, as well as physical host controller interface (pHCI) 290 and pHCI 300. The pHCIs, which may be conventional host bus adapters (HBAs), provide the hardware interface between the software layers 230 and the storage devices 240–250.

Thus, the driver 260 creates a command packet and sends it down to the SCSA layer, which hands the packet off to the vHCI layer. The MDI layer includes a multiplexed I/O (MPXIO) module 310, which the vHCI layer consults to determine which pHCI is in use, e.g. 290 or 320.

The multiplexed I/O module 310 in a preferred embodiment of the invention takes the form of software associated with the MDI 300, but other embodiments are possible. In general, the architecture and functions of the present invention may be implemented as hardware, software and/or firmware in any combination appropriate to a given setting. Thus, these terms should be interpreted as interchangeable for the present invention, since where one is specified the others may be used. In particular, the terms "program", "architecture", "module", "software" etc., may in practice be implemented as hardware, software, firmware or the like, as appropriate.

The MPXIO module 310 informs the vHCI layer 280 which pHCI is in use (e.g. PHCI 300 for this example), and the vHC layer 280 accordingly hands the packet off to pHCI 300. The pHCIs 290 and 320 are responsible for the physical transport of packets over fibre channel or other network connection to their respective client devices.

Figure 4:
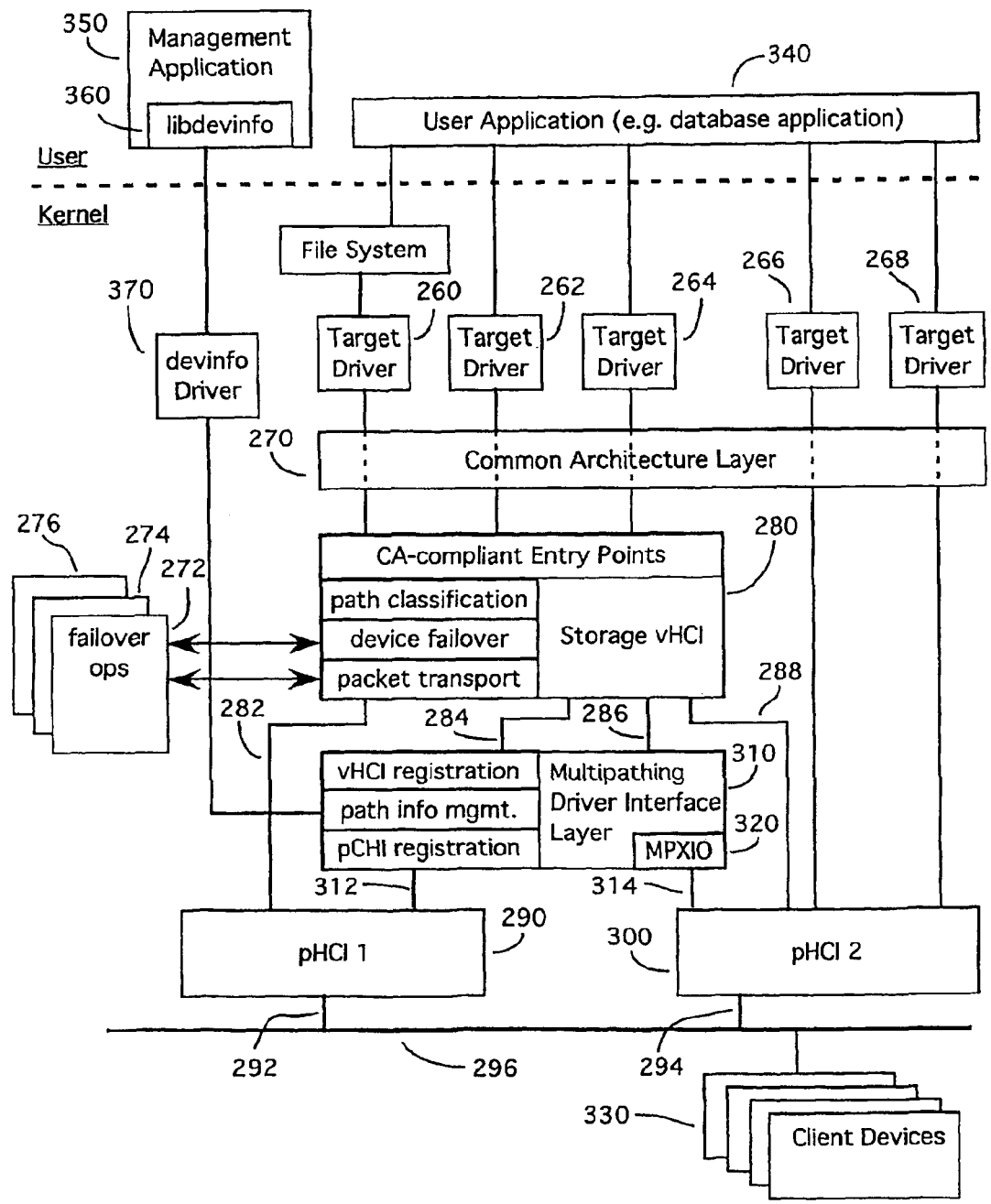
FIG. 4 is a block diagram showing details of the new architecture of FIG. 3.

FIG. 4 shows an embodiment of the invention incorporating features not represented in FIG. 3, but the description of the common features of these two figures is applicable to both. FIG. 4 illustrates a hybrid arrangement, in which both the vHCI layer 280 and MDI layer 300 are used in connection with target drivers (e.g. disk drivers) 260–264, but additional target drivers 266–268 are also whose I/O packets are not passed through the vHCI and pHCI layers. The target drivers may be, as with FIG. 3, disk drivers, tape drivers, and/or other combinations of appropriate device drivers. The operation of the hybrid system is discussed in detail below.

Thus, the embodiment of FIG. 4 allows the use of prior, conventional architecture in combination with an architecture of the present invention, allowing for flexibility in the system's configuration when an MDI layer 310 specific to one or more of the client devices 330 has not yet been created.

The embodiment of FIG. 4 also shows a user application (for instance, a database application) 340, a management application 350 using a library 360 called "libdevinfo", which provides user programs access to read-only information about the device tree. The libdevinfo library exports device nodes, minor nodes, and device properties in the form of a consistent "snapshot" of kernel state. Internally, libdevinfo interacts with the devinfo driver 370, which gathers state information about the device tree into a buffer for consumption by the libdevinfo library 360. See Appendix A, Section 5 for a more complete description of how a conventional libdevinfo library may be modified and used in conjunction with an embodiment of the present invention.

Packet Flow According to the Invention

The general flow of an I/O request taken from the perspective of a client driver is as follows:

1. Allocate a command packet for use by the driver to construct the I/O request. This may result in a call into the devices parent nexus driver to allocate (HCI) resources for the command packet. e.g. scsi_init_pkt (9f).
2. The driver prepares any data to be transmitted and initializes the command packet to describe the specific I/O request—e.g. scsi_setup_cdb(9f).
3. The driver submits the I/O request packet to the framework, which attempts to start or queue the request at the device's parent HCI, e.g. scsi_transport(9f).
4. The drivers interrupt handler or command completion callback function is invoked by the framework with a success or failure code for the I/O request. If the request is completed in error, the driver may fetch additional error status and choose to retry or fail the request.

This model lends itself well to disassociating multipath devices from specific paths, since the decision of which pHCI device transports the I/O request is left to the framework, and is not known by the client driver making the request for transport services.

Implementation Concepts of the Invention

This section discusses concepts of the invention that may be implemented in a UNIX or other OS setting.

1. vHCI Drivers

The vHCI drivers of the invention are pseudo nexus drivers which implement multipath services for a specific command set or bus architecture. There is a single instance of a vHCI driver for each command set that supports multipath devices. The framework creates the instance whenever a MPXIO-compliant pHCI driver registers its command set transport services with the framework.

An instance of a vHCI driver preferably provides the following services or capabilities:

Single-instance multipath devices
Multipath configuration management
I/O request routing and policy-based load balancing
Path failover support
pHCI naming service interfaces
pHCI transport service interfaces A. Single-instance Multipath Devices The vHCI nexus provides a path-independent bus nexus under which multipath client devices can be attached. Client devices are created as they are registered with the framework by the pHCI devices.

This provides both a path-independent name in /dev and /devices, as well as eliminating the need for layered drivers to recombine multiple devices instances back into a pseudo-single instance device. Eliminating multiple path-dependent names to a device provides a number of additional side benefits:

Elimination of the "sliding controller" problem. The logical controller number for clients of the "vHCI" driver instance will remain constant since the vHCI driver will never move.

Eliminating the need for device renaming upon HCI replacement. Certain HCI devices are named using some form of GUID such as a WWN (worldwide name). If a device is replaced, the OS will treat any devices attached to it as new devices, since the physical pathname to the device has changed. System administrators currently are forced to hand-edit sensitive system configuration files and reboot, in the hope that the devices will return to their original names. This runs the risk of leaving the system unable to boot. Such a naming scheme may thus impose a naming restriction on pHCI drivers, namely that;

(a) pHCI drivers are required to support self-enumeration of child devices; and
(b) pHCI drivers must be capable of generating a unique identifier (GUID) for a device prior to instantiate the device into the OS.

This present invention delivers an implementation of a vHCI driver for SCSI-3 Fibre Channel devices. An appropriate name of the node in the OS device tree would be:

/devices/scsi_vhci with client (targets) devices having names of the form:

/devices/scsi_vhci/ssd@w220000203709c3f5,0:a

B. Multipath Configuration Management

With this architecture, the mapping of available paths to client devices is automatically discovered and managed by the framework as part of the client device enumeration and registration process undertaken by the pHCI devices. This eliminates the need for static configuration databases, which typically contain data that could easily change in future hardware configurations, which will be accommodated by the present invention.

The vHCI driver is also expected to supply interfaces to user-level system management applications for querying and managing the pathset configurations being maintained by an instance of a vHCI.

The vHCI query interfaces return the following types of information:

1. The list of pHCI devices providing transport services to the vHCI layer
2. The list of pathsets maintained by the vHCI layer
3. The list of client devices being maintained by the vHCI layer
4. pHCI-specific information:
   a. The list of attributes assigned to a pHCI device
   b. The list of pathsets a given pHCI device is configured into
5. Pathset-specific information:
   a. The list of attributes assigned to a pathset
   b. The list of pHCI devices configured into a pathset
6. Client device-specific information
   a. List the default pathset for the device
   b. The list of pathsets from which a device is accessible
   c. The list of pHCI interfaces from which a device is accessible
   d. The list of attributes assigned to the client device The vHCI path management interfaces support the following:

1. Autocreation of default pathsets as client and pHCI devices assemble;
2. Dynamic creation of pathsets;
3. Assigning of pHCI devices into specific pathsets;
4. Assigning the default pathset ID for client devices;
5. Removal of pHCI and client devices from existing pathsets;

6. Setting the default pathset for specific client devices; and

7. Setting attributes for a specific pathset, pHCI, or client device.

C. I/O Request Routing and Policy-based Load Balancing

The vHCI driver has the responsibility to select and route I/O requests from client devices attached beneath it to the "best" pHCI device that is providing transport services to the device. This routing decision considers both the default pathset assigned to a client device request, as well as any routing policy such as round robin or least busy which has been assigned to the pathset or client device.

D. Automatic and Manual Failover

The vHCI and pHCI drivers are responsible for managing failover, which is an important feature provided by this framework. Both automatic (e.g., a cable is unintentionally disconnected) and manual (e.g., a system administrator dynamically reconfigures a system board containing a pHCI) failover semantics are needed to be compatible with the support provided by the existing layered products.

If an interconnect or device error is noted by a pHCI driver instance, the vHCI layer is notified of the loss of transport service provided by the pHCI.

Figure 2:
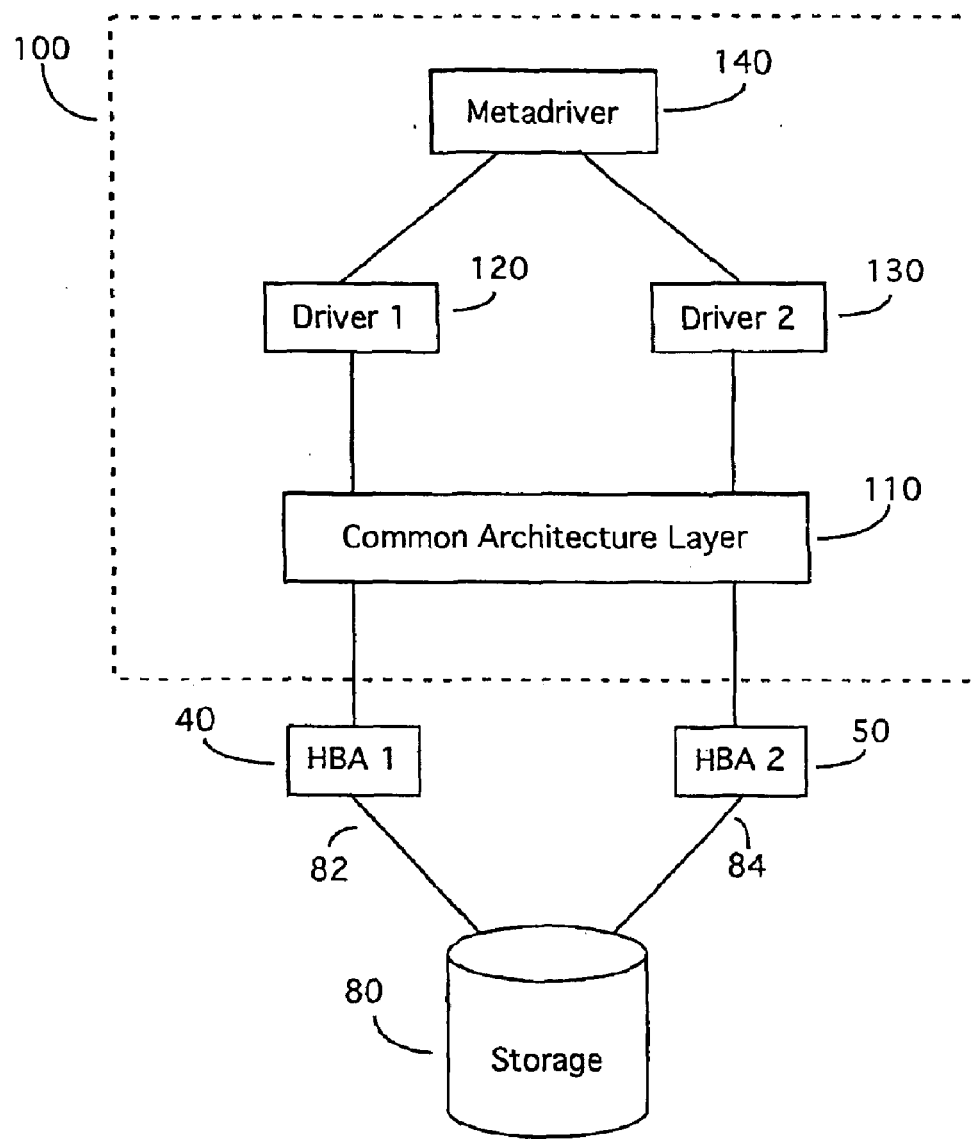
FIG. 2 is a block diagram showing a layered multipath architecture.

In a conventional system as illustrated in FIG. 2, once the metadriver 140 submits an I/O request to the driver layer, it has no control over that request until the driver gives up (e.g. in the event of a path failure). The driver 120 or 130 has no information about a multipathing layer above it, so when an error is encountered, the driver merely retries until a timeout or a predetermined number of retries has occurred, which can take several minutes for each retry.

Since the vHCI layer in the inventive design of FIGS. 3–4 is above the pHCI layer and below the common architecture layer (and in particular, below the target driver layer), any I/O request that comes back uncompleted is retried from the vHCI layer, which has information about other available paths because the multipathing driver interface is on the same level as the vHCI. As a result, futile retries can be avoided, because the level that detects the failed path is the same as the level that has information about alternative paths, unlike in previous systems.

In the example discussed above for prior systems, where the driver retries some number of times (e.g. twice) before sending a failure message up to the metadriver layer, in the present invention the vHCI can immediately (after a single failure) fail over to another path. Thus, the new system requires only two tries (one failed and one successful) to complete the I/O request, rather than four tries for the example given for prior systems, resulting in a significant time savings.

This points up an advantage of the new architecture: in a system as shown in FIG. 2, the disk (or tape) drivers must be multipathing—i.e., for each device type, a multipathing driver for that particular device type is needed. In the present invention as shown in FIG. 3, by way of contrast, the multipathing is handled at the vHCI layer, and the device-specific issues are handled at the target driver layer, so the multipathing module or layer 310 does not need to be programmed to handle the device-specific issues.

As a result, once a device driver is created, there are no additional issues involved in placing it in a multipathing setting. The vHCI is preferably written from the beginning to accommodate various device formats (disks, tapes, etc.), and all the device-specific actions (retries, error recoveries, etc.) happen at the target driver level. This isolation of the multipathing functionality at the vHCI level avoids the need for duplicating multipathing intelligence at different metadriver levels and integrating the multipathing into many different drivers. In addition to avoiding the need for a great deal of duplicative programming (for the different device types), it greatly reduces the number of different types of drivers needed.

A failover operation in the embodiment of FIGS. 3–4 proceeds as follows. When a given path such as path 292 (to bus 296, which connects to devices 330) fails, another path (e.g. path 294) is needed. It would be possible to code all the different device-specific information at the vHCI layer 280, but this would mean that any new device type that is added would require modification of the vHCI layer. Thus, preferably a set of one or more failover ops (operations) modules 272–276 is created, once for each type of storage device.

When the vHCI 280 needs to activate a path, it accesses the appropriate failover ops module (e.g. module 272) and sends and "activate" command. The module 272 then connects to the appropriate HBA (pHCI) driver with the correct protocol.

This modular approach allows new device types to be added merely by adding a new failover ops module, and otherwise leaving the vHCI layer unchanged. The vHCI and all of the failover ops modules can be compiled into a single driver at boot-up, or the failover ops modules may be compiled separately. In the latter case, it is possible to hot-plug a new device into the system and provide its failover ops module for real-time device discovery and operation. If the vHCI is regarded as a standard interface, then different companies' devices can simply connect to that interface, and a heterogeneous storage environment is created with automatic failover capability.

2. vHCI—pHCI Driver Interface

Since the vHCI and pHCI drivers implement to a common command set and bus protocol (such as SCSI-3), the interface between the two drivers is specific to the implementation. In a SCSI-3 implementation, both the vHCI driver and pHCI drivers are implemented in the model of a SCSI HBA.

3. pHCI Driver Changes

The physical HCI drivers are changed only moderately by this architecture; the most significant change that of bus enumeration.

Device enumeration: instead of attaching identified child devices to the individual pHCI device instances, the pHCI drivers will call mdi_devi_identify(9m) to notify the framework of identity and visibility of the device from the particular pHCI instance. The framework will either a) create a new instance for the device under the vHCI layer if it does not already exist or b) register the pHCI device as an available transport for the device.

A pHCI driver is expected to support the bus_config(9b) and bus_unconfig(9b) nexus driver busop entry points. The vHCI driver will invoke these entry points to manually drive enumeration of specifically named devices.

4. Paths and Pathsets

Another feature of the proposed architecture is the addition of the notion of paths and pathset as manageable objects in the OS.

A path may be defined as a software representation of a hardware device which is providing device identification and transport services for a command set implementing this architecture. A path may have attributes assigned which describe the capabilities of the path to the vHCI driver implementation.

Pathsets, as the name suggests, are aggregations of paths, and are a natural addition to the processor set model already in the OS.

The framework defines a number of default pathsets to define aggregations such as "all-available-paths". The framework also supports creation and management of pathsets by applications. System administrators could use this feature to bind specific pHCI devices to a pool of database storage devices to isolate database traffic from other the effects of other users of the system.

The vHCI driver checks the pathset information assigned to the packet; if none has been defined at packet level, the vHCI driver uses the default pathset that is defined for the device.

In a system according the foregoing description, the vHCI layer manages multiple pHCIs, resulting in several important advantages, including:

1. It simplifies device naming. The system now only sees a single SSD device name for each SSD device. (SSD refers, for example, to a fibre channel SCSI disk device driver.)
2. It provides a load balancing mechanism. Since there are multiple paths to the target devices (accessed through different ports), the system can implement a load balancing mechanism to access different devices by these different paths, as desired.
3. It provides a failover mechanism. Target devices with multiple ports (e.g. a disk drive with two ports) may be asymmetric, i.e. the target device can be accessed through only one port at a time. One port is thus active, and the other (in the case of two ports) is passive, or inactive.

If the active port is down, i.e. is not functioning for some reason, the pHCI notifies the vHCI layer, as well as the MPXIO layer, and the vHCI layer initiates a failover to the inactive port, making it active.

Features of Various Embodiments of the Invention

IP multipathing which enables link aggregation and failover for systems with multiple network interfaces is an appropriate setting for an embodiment of this invention, providing equivalent functionality for multipath storage devices.

Following are other features in connection with which the present invention can be implemented:

- Modify the core OS to support MPXIO devices, including support for booting, DR, and power management.
- Define a generic scheme for representing single instance MPXIO devices within the OS.
- Enable multipath device configurations to dynamically self-assemble during boot and dynamic reconfiguration, not relying upon on-disk configuration databases to describe the multipath configuration.
- Define a common architecture for I/O path management in the OS.
- Define a set of requirements to be implemented by the MPXIO-compliant target and HCI drivers (properties and behavior).
- Support automatic failover to route I/O requests through alternate active paths on transport failures.
- Support manual switchover to enable dynamic reconfiguration.
- Provide tunable load balancing for improved I/O performance. Initial implementation will include a simple Preferred path (Priority scheme) and Round Robin load balancing schemes. Other implementations may include such schemes as Least I/Os per path and Least blocks per path.
- Integrate with other multipathing solutions.

This architecture is suitable for an environment in which the client devices for a given command set can be uniquely identified using some form of GUID prior to configuring the device into the OS device tree.

Data Security

In a conventional system such as in FIG. 2, multiple drivers 120, 130, etc. are used. For multipath I/O, an I/O request should go through the metadriver layer 140, and thence through a driver to the common architecture layer 110, and through an HBA to the storage device. However, it is possible for an application to write directly to a driver (which will be identifiable through a UNIX "format" command), bypassing the metadriver layer, while another application may be writing via the metadriver, resulting in data corruption.

Since the present invention places the multipathing layer below the target driver layer, this bypass is closed off. All I/O requests to a storage device in FIG. 3 or 4 must pass through the driver (260–264) ultimately to the vHCI layer, which handles the multipathing. Since there is only one entry point, there is no opportunity for a user to write an application that bypasses the multipathing driver interface layer 310.

Hybrid System Operation: FIG. 4

In FIG. 4, paths 284 and 286 connect the vHCI layer 280 to the MDI layer 310, which in turn connects via paths 312 and 314 to the pHCIs 290 and 300, respectively. In addition, direct paths 282 and 288 connect the vHCI layer 280 directly to the pHCIs 290 and 300, i.e. without passing through the MDI layer 310 (though, depending upon the embodiment, there may be other hardware or software on these otherwise direct paths).

At boot-up or at other selected times (e.g. when a device is hot-plugged into the system), the pHCIs execute a device enumeration or discovery operation, determining the number, nature and paths of the various devices on the system. Device discovery itself can be done in a conventional manner. The device and path information is stored at the MDI level, which is preferably provided with a database or table for this purpose.

When discovery is complete, an I/O request coming down from a target driver via the common architecture layer 270 is sent to the vHCI layer 280. The vHCI provides the requested device information to the MDI, and the MDI—which has the information about paths to the devices—selects and sends back information about an available path to the vHCI.

The vHCI has the information about the pHCIs, so for the given pHCI it retrieves a "handle" (a path_info_node), which includes data structures used to communicate directly to the given pHCI. For instance, if this pHCI is pHCI 290, then the vHCI uses the direct path 282.

Each pHCI (or HBA) thus implements a set of interfaces that are defined by the common architecture (e.g. SCSA), which define the methods needed, e.g. for transporting a packet.

In the system shown in FIG. 4, the common architecture layer 270 can also communicate directly to one or more pHCIs (here, pHCI 300). Here, "directly" means without passing through a virtual host controller interface layer, though there may be other software or hardware elements along the path from the common architecture layer to a given pHCI. To the common architecture layer, the vHCI appears as simply another HBA, so when an I/O request comes from target driver 266 or 268, the common architecture layer treats it in the same manner as a request from a target driver 260–264, though in one case the request goes to the pHCI 300 and in the other it goes to the vHCI 280.

Thus, adding the MDI layer 310 allows the vHCI layer 280 to manage I/O requests to all connected devices 330, by effectively acting as a virtually single HBA (from the point of view of the common architecture layer), but in fact communicating with multiple HBAs (pHCIs).

What is claimed is:

1. A multipathing subsystem in a computer system having a system interface layer and at least one physical host controller interface (pHCI) in a pHCI layer, including:
   a virtual host controller interface (vHCI) coupled to and interacting with the system interface layer;
   a multipath I/O module maintaining path information for the at least one pHCI and for informing the vHCI of the at least one pHCI, wherein the vHCI layer interacts with the multipath I/O module to determine the pHCI to use for a received target driver command packet, and wherein the vHCI is configured to transport received target driver command packets to the determined pHCI.

2. The subsystem of claim 1, where the system includes multiple pHCIs, which provide a physical transport mechanism to transport command packets to target devices.

3. The system of claim 1, further including a plurality of target driver modules configured to communicate with a plurality of physical interfaces, wherein at least a first target driver module is coupled to a first physical interface through the virtual host controller interface, and at least a second target driver module is coupled directly to a second physical interface.

4. The system of claim 1, further including at least one failover operations module configured to provide a failover protocol relating to a first target device to the virtual host controller interface.

5. The system of claim 4, wherein the failover operations module is configured to compile with the virtual host controller interface.

6. The system of claim 4, wherein the failover operations module is configured to compile separately from the virtual host controller interface.

7. The system of claim 6, configured to receive a second failover operations module without recompiling the virtual host controller interface.

8. The system of claim 6, wherein the virtual host controller interfaces with physical interfaces for different types of devices to perform the operations of determining information relating to the plurality of paths, determining the plurality of physical interfaces, and determining the physical interface to use for the different types of devices, and wherein the virtual host controller I/O receives packets from the target driver module for different types of devices.

9. A processor-based system, including:
   a processor configured to generate input/output (I/O) requests;
   at least one target device capable of receiving the generated I/O requests;
   at least one physical interface configured to couple to the device;
   at least a first and second paths each providing communication to one target device through one physical interface;
   a memory in communication with the processor and configured to store program instructions;
   at least one target driver module stored in the memory and configured to generate instructions specific to the at least one target device;
   a virtual host controller interface stored in the memory and in communication with the target driver module;
   a multipath driver module stored in the memory and in communication with the virtual host controller interface; and
   wherein the multipath driver module is configured to generate path information relating to paths to each target device and provide the path information to the virtual host controller interface, and wherein the virtual host controller interface is configured to pass I/O requests to a physical interface associated with a selected path to the target device.

10. The system of claim 9, wherein the multipath driver module is configured to determine each of a plurality of paths to the target device at a predetermined time.

11. The system of claim 10, where the predetermined time is at boot-up of the system.

12. The system of claim 10, wherein the predetermined time is at a user-selected time after boot-up of the system.

13. The system of claim 9, wherein the virtual host controller interface is further configured, in the event of detection of a failed path, to resend a request to the selected target device by way of another path.

14. The system of claim 13, further including a common architecture layer between the target driver and the virtual host controller interface, the common architecture layer configured to generate instructions adapted for execution by the at least one physical interface.

15. The system of claim 14, wherein the common architecture layer is configured to communicate with at least a first target device through the virtual host controller interface and at least
   a first physical interface, and is coupled directly to at least a second physical interface to communicate with at least a second target device.

16. A method for multipath input/output communication with at least one target device coupled to a processor based system, comprising:
   receiving an I/O packet from a target driver directed to one target device;
   interfacing with an I/O module to determine information relating to a plurality of paths and a plurality of physical interfaces, wherein each path defines a connection through one physical interface to one target device;
   using the determined information to determine one path to use to access the target device to which the received I/O packet is directed;
   forwarding the I/O packet to the physical interface corresponding to the determined path to use, wherein the physical interface transmits the I/O packet to the target device.

17. The method of claim 16, wherein the physical interfaces are for different types of devices, wherein the operations of determining information relating to the plurality of paths, determining the plurality of physical interfaces, and determining the physical interface to use are performed for the different types of devices, and wherein the received packets from target drivers are directed to different types of devices.

18. The method of claim 16, wherein the interface code interfaces with physical interfaces for different types of devices to perform the operations of determining information relating to the plurality of paths, determining the plurality of physical interfaces, and determining the physical interface to use for the different types of devices, and wherein the interface code receives packets from target drivers for different types of devices.

19. The method of claim 16, wherein interfacing with the I/O module to determine information relating to the paths further comprises:

locating a number of target devices coupled to the system; and determining at least one path to the located devices.

20. The method of claim 19, further comprising, in the event of a failure of a path to the target device:

selecting an alternative path to the target device; and reforwarding the I/O packet using the selected alternative path.

21. The method of claim 19, wherein the locating and determining steps are carried out at least at a time of boot-up of the system.

22. The method of claim 19, wherein the locating and determining steps are carried out at least at a time other than boot-up of the system.

23. The method of claim 19, further comprising:

accessing failover information relating to a first target device;

in the event of a failed path to the target device, using the failover information to access another path to the target device; and reforwarding the packet through the path accessed using the failover information.

24. The method of claim 19, wherein locating the target device and determining the at least one path to the target device steps are performed at a time other than at boot-up time of the system.

25. The method of claim 19, further comprising:

receiving failover information relating to the target device;

using the failover information to access another path to the target device in response to a failure of one path to the target device; and reforwarding the packet through the path accessed using the failover information.

26. Interface code implemented in a computer readable medium for multipath input/output (I/O) communication with at least one target device coupled to a processor based system, wherein a target driver is used to interface with and transfer packets to a target device via a physical interface for the device, wherein the interface code is executed to perform:

providing an I/O module;

receiving an I/O packet from the target driver directed to the target device;

interfacing with the I/O module to determine information relating to a plurality of paths, wherein each path defines a connection through one physical interface to one target device; and using the determined information to determine one path to use to access the target device to which the received I/O packet is directed; and forwarding the I/O packet to the physical interface corresponding to the determined path, wherein the physical interface transmits the I/O packet to the target device.

27. The interface code of claim 26, wherein determining information relating to the plurality of paths comprises locating a number of target devices coupled to the system, and for each target device, determining at least one path to the target device.

28. The interface code of claim 26, wherein locating the target device and determining the at least one path to the target device steps are performed at a time of a boot-up of the system.

29. The interface code of claim 26, further comprising:

selecting an alternative path to the first target device in response to a failure of one path to the target device; and reforwarding the I/O packet to the target device using the selected alternative path.

* * * * *

UNITED STATES PATENT AND TRADEMARK OFFICE
CERTIFICATE OF CORRECTION

PATENT NO. : 6,904,477 B2
DATED : June 7, 2005
INVENTOR(S) : Padmanabhan et al.

It is certified that error appears in the above-identified patent and that said Letters Patent is hereby corrected as shown below:

Title page,
Item [75], Inventors, "Sunnyvale, CA (US)" should read -- San Francisco, CA (US) --.
Item [57], ABSTRACT,
Line 6, "decives" should read -- devices --.

Column 14,
Line 31, after "input/output", insert -- (I/O) --.

Signed and Sealed this

Twenty-third Day of August, 2005

JON W. DUDAS
*Director of the United States Patent and Trademark Office*